(No Model.) 3 Sheets—Sheet 1.

W. BALZ.
FILTERING APPARATUS.

No. 515,894. Patented Mar. 6, 1894.

WITNESSES:
Charles Schroeder
Adolph Scherer

INVENTOR
W. Balz
BY Guepel & Ruegener
ATTORNEYS.

(No Model.) 3 Sheets—Sheet 3.

W. BALZ.
FILTERING APPARATUS.

No. 515,894. Patented Mar. 6, 1894.

WITNESSES:

INVENTOR

ATTORNEYS.

UNITED STATES PATENT OFFICE.

WILHELM BALZ, OF FLONHEIM, GERMANY.

FILTERING APPARATUS.

SPECIFICATION forming part of Letters Patent No. 515,894, dated March 6, 1894.

Application filed April 18, 1893. Serial No. 470,887. (No model.) Patented in France August 8, 1892, No. 223,538.

*To all whom it may concern:*

Be it known that I, WILHELM BALZ, a subject of the German Emperor, residing in Flonheim, near Bingen-on-the-Rhine, in the Grand Duchy of Hesse, Germany, have invented certain new and useful Improvements in Filtering Apparatus, (for which I have obtained Letters Patent in France on the 8th day of August, 1892, No. 223,538,) of which the following is a specification.

The object of this invention is to provide a filtering apparatus in which the fluid to be filtered is first conducted into a space bounded by two filtering plates connected with each other, then passes through a filtering mass surrounding these filtering plates and finally passes into the hollow space of a second double filtering plate and from there passes to the inner wall of the vat or vessel containing the filtering apparatus and flows off through vertical grooves in said vessel or vat. Said inlet and outlet double filtering plates are preferably arranged in several rows above each other in a manner that the inlet and outlet plates alternate and are separated from each other by a homogeneous filtering mass.

Figure 1:
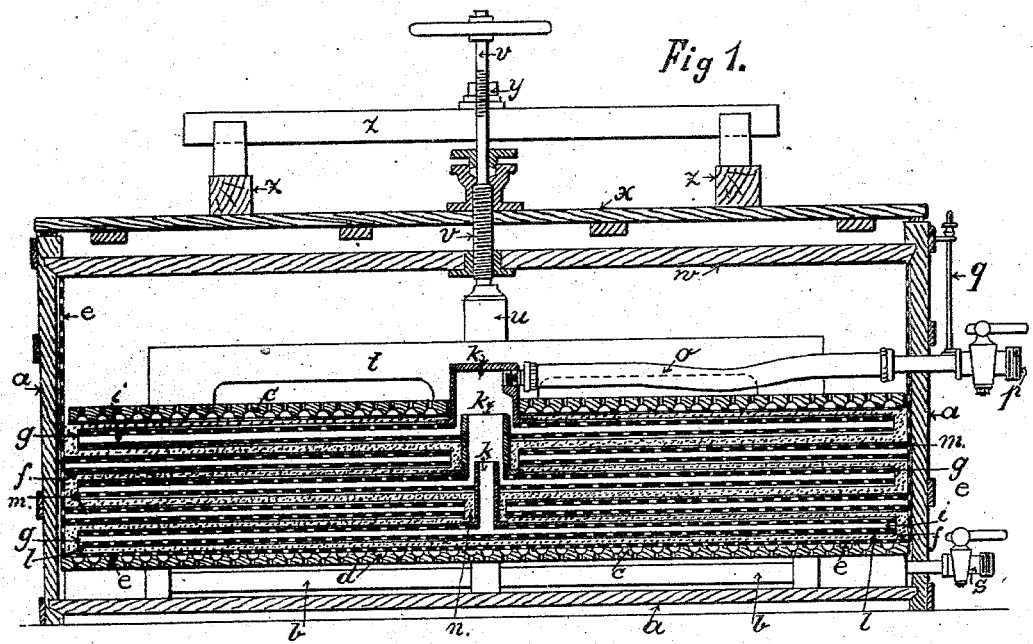
Figure 2:
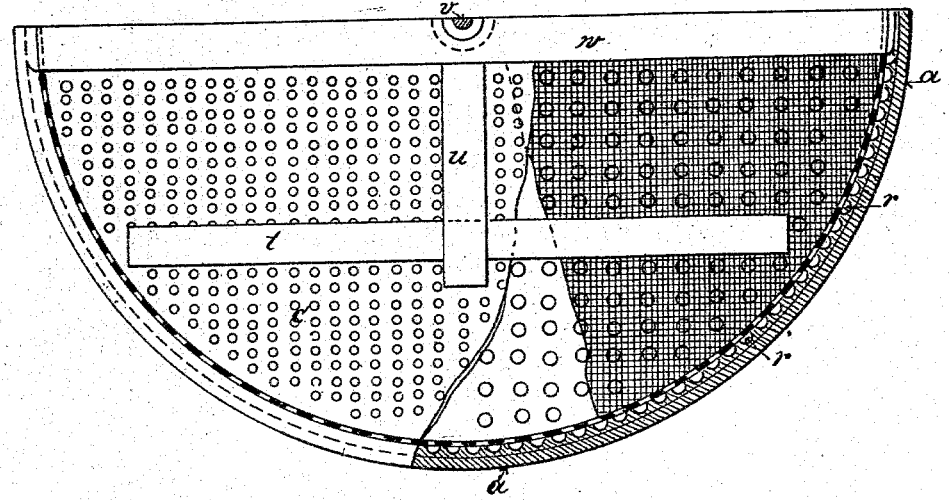
Figure 3:
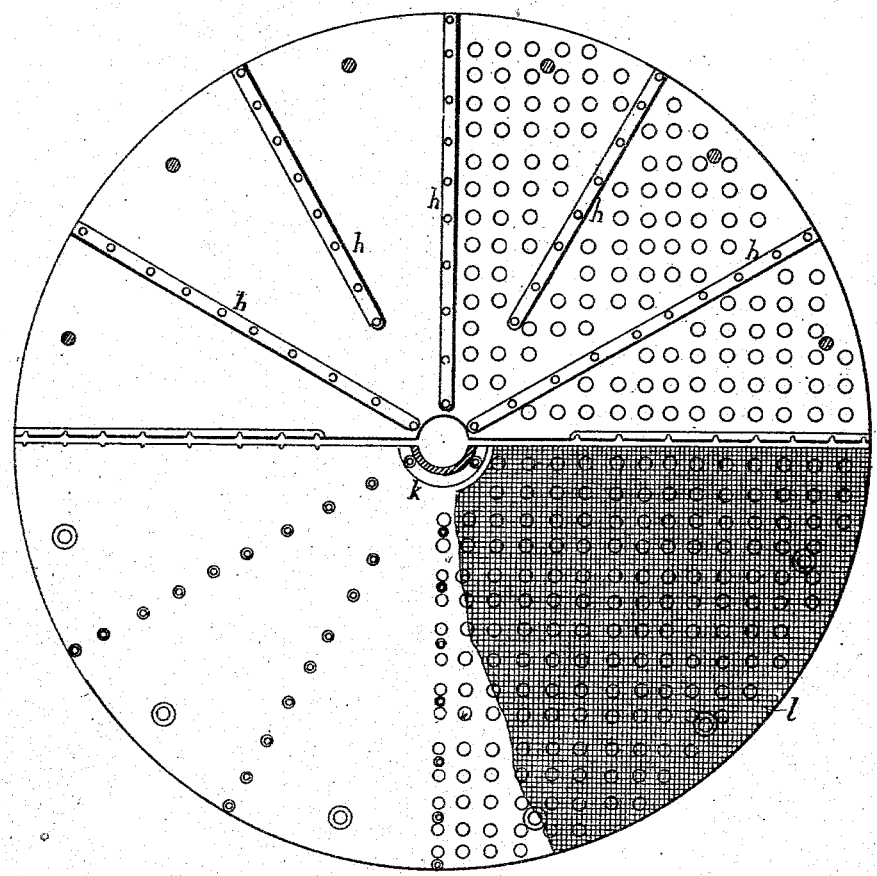
Figure 4:
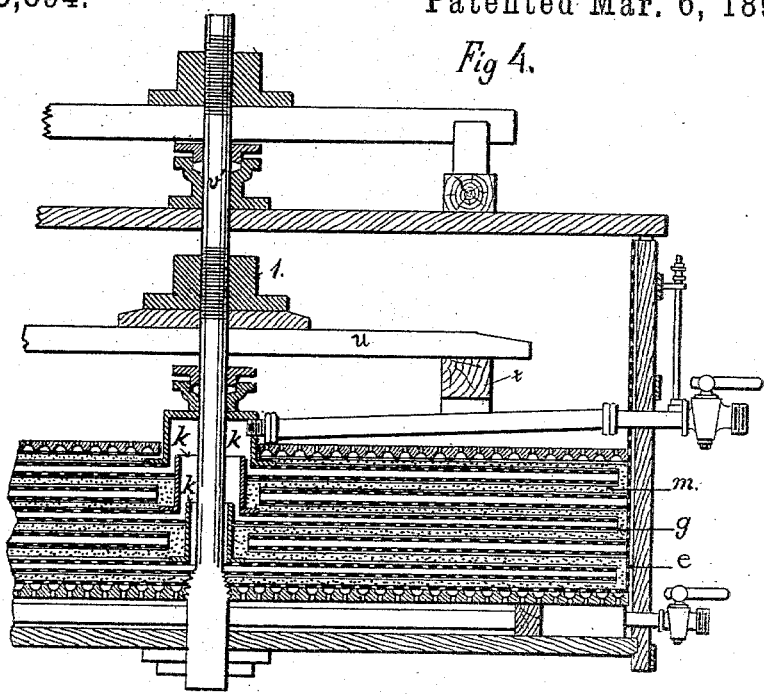

In the accompanying drawings, Figure 1 is a vertical transverse central section through my improved filtering apparatus. Fig. 2 is a plan-view of one-half of the same, the cover of the vat being removed. Fig. 3 is a plan-view, showing the upper and lower plates of one of the double inlet filtering plates, parts being broken out. Fig. 4 represents a vertical diametrical section of this improved filtering apparatus in which the spindle for actuating the mechanism for compressing the plates, extends through the bottom plate and the bottom of the vat.

Similar letters of reference indicate like parts in all the drawings.

The filtering plates are placed into a circular vat or vessel $a$, the sides of which preferably decrease in thickness from top to the bottom. On the bottom of this vat a supporting beam $b$ is arranged, upon which an apertured filtering plate $c$ rests, which is provided in its upper surface with horizontal grooves $d$. Upon the filtering plate $c$ a cage screen $e$ rests, the outer walls of which are in close contact with the annular walls of the vat $a$.

The said cage-screen $e$, which may be lined with muslin or like material, contains the inlet and outlet double filtering plates, which are placed in the same in the following manner. Upon the bottom of the cage-screen a layer $f$ about an inch and one-half in thickness, of any suitable filtering substance, is placed, and upon this layer $f$ an inlet double filtering plate $g$ is placed. This double inlet filtering plate $g$ consists of two rigidly connected circular apertured disks, which are held separated from each other by radial separating strips $h$, so that a space $i$ is formed between said disks, which space is divided by the separating strips $h$ into a series of chambers. The upper disk is provided at its center with a rigidly secured short neck $k$, and is in communication with the space $i$ formed between the said disks. Through this neck the fluid to be filtered is conducted into the space $i$ of the double filtering plate $g$. Each of the two disks of the double filtering plate $g$ is covered on the outside with a screen-cloth or wire-netting. The double filtering plate $g$ is open at its outer edge and has less diameter than the vat $a$ or the cage-screen $e$, and the annular space between the rim of the double filtering plate $g$ and the side of the cage-screen $e$, is filled with filtering mass. On the upper surface of the filtering plate $g$ a layer of filtering mass is applied, and upon this a double outlet filtering plate $m$ is placed. The latter is formed and constructed in the same manner as the inlet filtering plate $g$, but is not provided at the middle with a neck but with an opening $n$ extending through both disks, through which opening the neck $k$ of the inlet filtering plate $g$ projects. Around the said neck the opening is filled with a filtering mass. The outlet plate $m$ has greater diameter, so that its outer edge rests against the inner wall of the cage-screen. Upon this outlet plate $m$ another layer $f$ of filtering material is placed, upon this a second inlet plate $g$ is arranged, which differs from the other only that it has a neck $k$ of greater diameter and is provided in its lower disk with a hole through which the neck $k$ of the first inlet filtering plate can pass, the lower neck $k$ projecting some distance into the second neck $k$. In this manner inlet and outlet plates are arranged alternately and each following inlet plate g has a neck k of greater diameter than that of the inlet plate next below it. Upon the layer of filtering mass upon the uppermost inlet plate g a screen-plate c is arranged, which corresponds to the screen-plate c resting on the supporting beam b of the vat but is merely reversed. The neck k of the uppermost inlet filtering plate is closed at its top but has a side-opening which is connected by a hose or flexible tube o with a cock p passing through the side of the vat. Through this cock the liquid to be filtered is forced under pressure into the apparatus. Before admitting the liquid a small cock q is opened, which is connected with the cock p and through which the air displaced by the entering liquid can escape. The entering liquid passes into the necks k of the several inlet filtering plates g and passes from the same into the several spaces i of said inlet filtering plates. It is distributed into several chambers and passes through the holes in the disks of the filtering plates into the mass f, and after passing through the latter passes into the chambers of the outlet plates m and passes through the outer rims of the same through the walls of the cage-screen e into the vertical grooves r in the inner wall of the vat a. In the said vertical grooves the filtering liquid flows down upon the floor of the vat and is drawn off from the same through the cock s. Through the top and bottom filtering plates c, which are not constructed as double plates, the liquid also passes. The liquid that has passed through the top filtering plate c also flows down through the grooves r to the bottom of the vat. So that the filtered liquid is absolutely clear, the filtering mass between the several filtering plates must be properly compressed, and this is accomplished by means of the following devices. On the top filtering plate c two bridges t are placed and on the same a transverse beam u rests, which can be pressed down by means of a screw-spindle v provided at its upper end with a suitable hand-wheel. The screw-spindle v passes through a nut that is fixed in the transverse beam w parallel to the bridges t, the ends of which beam w are held in notches in the walls of the vat near the upper edges of the same. After the filtering mass has been compressed sufficiently by turning the screw-spindle v the hand wheel from the upper end of the spindle is removed, a packing-ring is placed on the upper edge of the sides of the vat and upon said packing-ring the cover x is placed. The spindle v passes through a stuffing-box of the cover-plate, so as to form a tight joint, and for the purpose of pressing the cover firmly on the top edge of the vat the nut y is used, through which nut the spindle passes, which nut is held on the beams z so that when the spindle is turned the nut and the beams z are pressed down on the cover and the latter is pressed on the top of the vat.

The above described filtering device can also be constructed as shown in Fig. 4. In this construction the screw-spindle v' passes successively through all the filtering plates and through the bottom of the vat. The washer is placed on that part of the spindle projecting from the bottom of the vat and then a key is driven through the projecting end of the spindle. The spindle is provided with a series of annular steps or shoulders N where it passes through the bottom filtering plates, so as to form a tight joint and to prevent the liquid to be filtered from running off. Above these annular steps or shoulders the spindle passes through the several necks k, which are enlarged correspondingly, and then passes through a stuffing-box of the uppermost neck k. The beam u and bridges t on the uppermost filtering plate are pressed upon the same by turning the nut l. The cover of the stuffing-box of the top neck k is only tightened after the parts have been compressed as stated. The cover of the vat is pressed down in the manner previously described.

The apparatus herein described can be made of wood, metal or partly of wood and partly of metal. The metal parts must be tinned, in case they are not made of brass.

Having thus described my invention, what I claim as new, and desire to secure by Letters Patent, is—

1. In a filtering apparatus, the combination of a series of double inlet filtering plates having central openings, a series of double outlet filtering plates having central openings and arranged in alternation with the inlet filtering plates, an inlet pipe communicating with said central openings, a filtering mass disposed between said inlet and outlet filtering plates, and a cage screen surrounding said filtering plates and filtering mass, substantially as set forth.

2. In an apparatus for filtering, the combination with a vat having vertical grooves in the inner surface of its side-wall, a cage-screen placed in said vat and a series of alternating double inlet filtering plates g and double outlet filtering plates m placed in said cage-screen and layers of filtering mass between the several filtering plates, substantially as set forth.

3. In a filtering apparatus, the combination, with a vat, of a cage-screen in the same, a series of alternating double inlet filtering plates g and double outlet filtering plates m in said cage-screen, the double inlet filtering plates g having less diameter than the double outlet filtering plates m, the said plates g being provided with a neck at the center, the neck of each inlet plate projecting through the adjacent outlet plate and into the bottom of the neck of the next higher inlet plate, substantially as set forth.

4. In a filtering apparatus, the combination of a vat, a series of alternating double inlet and outlet filtering plates, filtering material between said filtering plates, the inlet plates being provided with a neck at the center, the lower neck projecting into the neck above, the neck of the uppermost plate being closed and provided with a tube extending through the walls of the vat, a screw spindle extending through said neck, and means actuated by said screw spindle for imparting pressure to said plates, substantially as set forth.

5. In a filtering apparatus, the combination with a vat, of a series of alternating double inlet and outlet filtering plates, filtering mass between said several plates, the inlet plates each being provided with a neck at the center, the neck of each inlet plate projecting upward and into the bottom of the next inlet plate above, the neck of the uppermost inlet plate being closed and a tube extending through the walls of the vat to said closed top inlet neck, substantially as set forth.

6. In a filtering apparatus, the combination of a vat, a series of alternating double inlet and outlet filtering plates, filtering material between said filtering plates, the inlet plates being provided with a neck at the center, the lower neck projecting into the neck above, the neck of the uppermost plate being closed and provided with a tube extending through the walls of the vat, a screw spindle extending through said neck, and means actuated by said screw spindle for imparting pressure to said plates, said spindle having an enlarged lower end provided with a tapering stepped portion which engages the lower filtering plate.

In testimony that I claim the foregoing as my invention I have signed my name in presence of two subscribing witnesses.

WILHELM BALZ.

Witnesses:
PAUL GOEPEL,
CHARLES SCHROEDER.